United States Patent

Benda

[11] Patent Number: 5,727,671
[45] Date of Patent: Mar. 17, 1998

[54] STEP CONVEYOR

[76] Inventor: Wilhelmus Benda, Molenweg 35, NL-3781 VA Voorthuizen, Netherlands

[21] Appl. No.: 581,617
[22] PCT Filed: Jul. 18, 1994
[86] PCT No.: PCT/EP94/02388
 § 371 Date: May 16, 1996
 § 102(e) Date: May 16, 1996
[87] PCT Pub. No.: WO95/03239
 PCT Pub. Date: Feb. 2, 1995

[30] Foreign Application Priority Data

Jul. 19, 1993 [NL] Netherlands ............... 9301266

[51] Int. Cl.⁶ .................................................. B65G 25/02
[52] U.S. Cl. ........................................ 198/740; 198/741
[58] Field of Search ........................... 198/468.1, 740, 198/741, 774.3; 414/750

[56] References Cited

U.S. PATENT DOCUMENTS

| 2,416,469 | 2/1947 | Cordis | 198/740 |
| 2,916,148 | 12/1959 | Crane et al. | 198/741 |
| 3,047,132 | 7/1962 | Wachsmuth | |
| 4,712,964 | 12/1987 | van Elten et al. | |
| 4,749,079 | 6/1988 | Minto | |

FOREIGN PATENT DOCUMENTS

| A13440940 | 6/1986 | Germany |
| 8801751 | 2/1990 | Netherlands |

Primary Examiner—Joseph E. Valenza
Attorney, Agent, or Firm—Walter H. Dreger

[57] ABSTRACT

Step conveyor comprising a primary stationary beam (1) and as secondary beam (2) being movable upwards and downwards as well as to and fro relative thereto. The secondary beam (2) is supported by restrictedly pivotable bow-shaped eccentrically journalled segments (3) resting on a stationary guideway (5). In each position the secondary beam (2) is positioned below the level of the primary beam (1). At its top the secondary beam (2) carries dogs (6) which in a nonoperative rest position are positioned below the level of the primary beam (1) and which in an operational position extend beyond the level of the primary beam (1) and can engage the objects (7) to be transported.

9 Claims, 1 Drawing Sheet

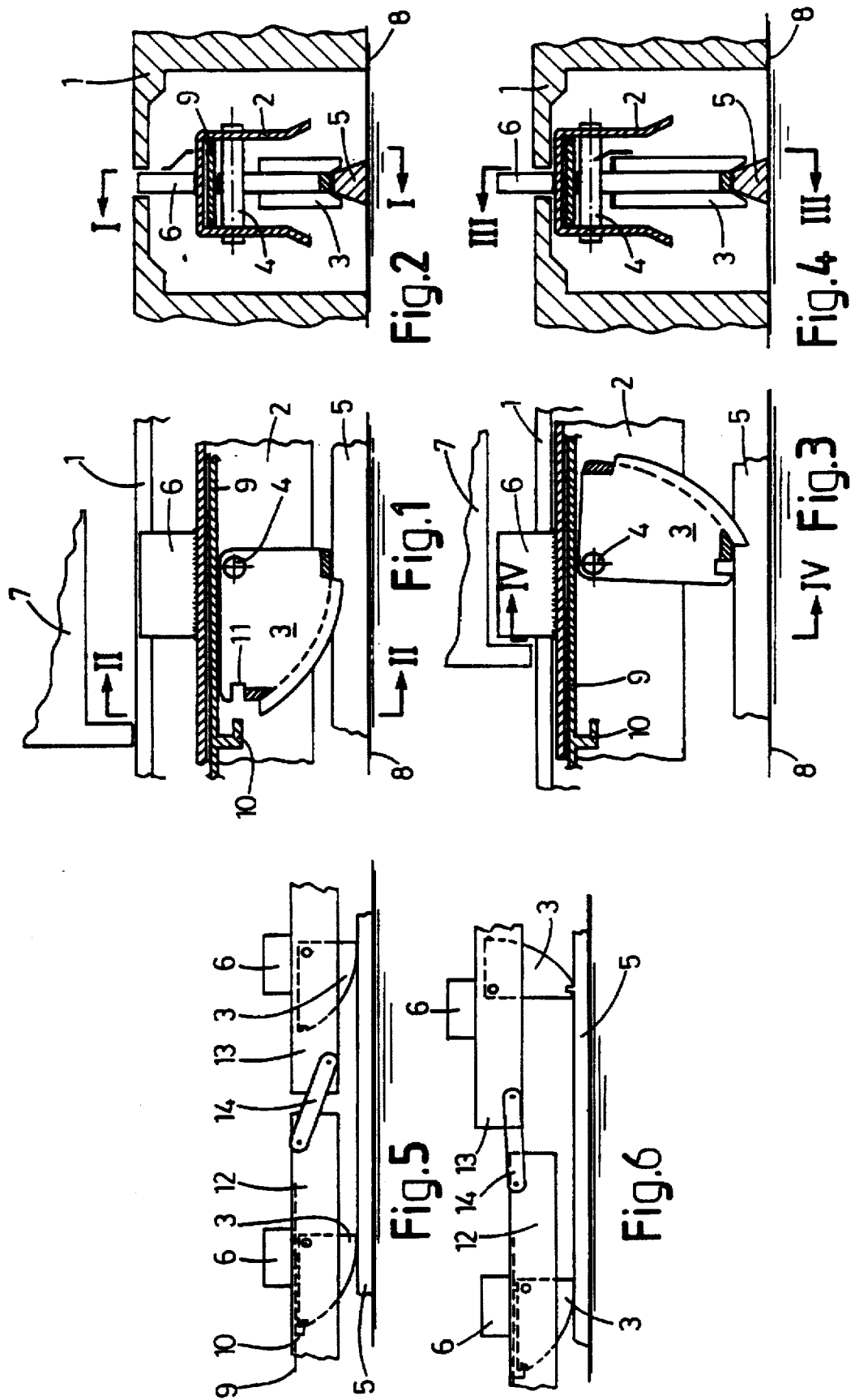

5,727,671

STEP CONVEYOR

The invention relates to a step conveyor comprising a primary stationary beam and a secondary beam being movable upwards and downwards as well as to and fro relative thereto, said secondary beam being supported by restrictedly pivotable bow-shaped eccentrically journalled segments resting on a stationary guideway, wherein in a rest position the secondary beam is positioned below the level of the primary beam.

A step conveyor of this type is known from Dutch patent application 88,01751. In a rest position of the step conveyor the bow-shaped (or spiral-shaped) segments are in a position, in which the distance between their point of contact with the stationary guideway and their pivot axis is minimal. In this position the secondary beam is positioned below the level of the of the primary beam (which is defined by rolls), objects placed upon the step conveyor are supported in this position by the primary beam. When the step conveyor is activated the secondary beam is moved longitudinally relative to the stationary beam. As a result the bow-shaped segments will pivot along the stationary guideway towards a new position in which the distance between their point of contact with this stationary guideway and their pivot axis is maximal. This means that the secondary beam is lifted relative to the stationary guideway and thus relatively to the primary stationary beam. In this position the known secondary beam engages the lower side of the objects to be transported and lifts these from the stationary beam. After the bow-shaped segments having reached this new position a continued longitudinal displacement of the secondary beam leads to a shift of the segments along the stationary guideway and a displacement of the objects.

Returning the secondary beam into the opposite direction firstly leads to re-pivoting the bow-shaped segments towards the first position, such that the secondary beam drops and the objects are positioned upon the primary beam. Next, after reaching their original pivotal orientation, the segments will slide back along the stationary guideway towards their starting position.

In this known step conveyor the secondary beam moves until above the level of the primary beam for lifting the objects to be transported. A major disadvantage is, that for lifting an additional force is required. A second disadvantage is, that vertical movements occur. A third disadvantage of this step conveyor is, that in the primary beam, which generally is shaped as a double beam enclosing the secondary beam or which is shaped as a working floor, a recess has to be created large enough to enable the passage of the secondary beam. As a result dirt can easily enter into the step conveyor and disturb its function. Especially in industries operating in a dusty environment, such as the textile industry where there is an overall presence of lint particles, this is a major disadvantage. Finally, as a fourth disadvantage, the large recesses negatively influence the safety and passableness of the working floor, of which the primary beams are a part.

It is an object of the invention to provide a step conveyor of this type, which does not show these disadvantages.

Thus the step conveyor, according to the invention is characterized as set forth in the main claim.

In accordance with the invention the secondary beam is in each position positioned below the level of the primary beam. This means, that the secondary beam does not any longer directly engage the objects to be transported, such that these remain supported by the primary beam and, as will appear later, will be compacted in a lesser way. The transport of the objects is realised now by means of dogs provided at the top of the secondary beam, said dogs in a working position (the position in which the bow-shaped segments have lifted the secondary beam relative to the primary beam) engaging the objects to be transported exclusively with a horizontal movement.

As noted above such a step conveyor is primarily applied in the textile industry. In this industry such step conveyors are used for example for transporting cans (drums) filled with strands of cotton or man-made fibres. At their bottom these cans have a projecting rim. In the present case the dogs may engage behind and on the inner side of this projecting rim, such that the cans are transported in an exactly centred way. The risk of the cans being displaced transversally relative to the conveyor is now eliminated.

Because now only dogs have to extend above the level of the primary beam the recesses in the primary beam may be reduced substantially compared to the known embodiment. As a result the entrance of lint into the structure of the step conveyor is effectively prevented.

A further advantage of the step conveyor according to the invention is, that the objects to be transported are not lifted and lowered. Especially when transporting the previously mentioned cans comprising cotton fibres such a lifting and lowering is a disadvantage, for the shocks created thus compress the fibres, and this is undesirable. Using the step conveyor according to the invention only a horizontal transfer of the cans occurs, such that the content of the cans is not any longer subjected to unwanted vertical movements.

In correspondence with a preferred embodiment of the step conveyor according to the invention the stationary guideway comprises a profile extending upwardly from a basis and having a contact surface at its highest point for engagement with the segments.

In the known step conveyor the stationary guideway comprises a profiled trough, into which the segments engage with their bow-shaped circumference. Lint which might enter the step conveyor generally goes to the lowest position, this being said profiled trough. As a result a good operation of the step conveyor may be obstructed. However, in accordance with the invention the operative section of the stationary guideway is positioned at a higher level, such that lint, which might enter, cannot disturb the good operation of the step conveyor.

Further a handy embodiment of the step conveyor according to the invention is characterized in that the secondary beam comprises at least two sections interconnected in such a way that a relative vertical movement is allowed but that a relative horizontal movement is prevented and wherein in at least one of these sections optionally activatable locking means are provided for preventing the segments from pivoting. Such an embodiment makes it possible to also displace vertically only a part of the secondary beam during its longitudinal displacement, such that only the dogs applied on that respective part of the secondary beam will engage the objects to be transported and resting upon the primary beam. Like this as desired certain objects will and certain will not be transported. The locked segments will only carry out a shift along the guideway without pivoting.

For realizing the above-mentioned embodiment it preferred, that the locking means comprise a strip which is slidable to and fro in the lengthwise direction of the secondary beam and which can be engaged with or disengaged from recesses provided in the segments. When the shiftable strip engages the recesses provided in the segments the segments cannot pivot. Longitudinally displacing the secondary beam then only leads to a shift of the respective segments along the stationary guideway. When the shiftable strip disengages the recesses the respective segments in addition can pivot, such that the respective part of the secondary beam is displaced vertically too relative to the primary beam. As a result the respective dogs can engage the objects to be transported.

For activating the strip it is possible, that a drive means mounted in the secondary beam, such as a cylinder-piston assembly, is provided. Such a location offers advantages, because the secondary beam often is shaped as a reversed U-shaped profile, in which there is space for housing such a drive means.

Further it is preferred that the stroke of the secondary beam is adjustable. Thus the possibility is given to selectively transport objects or not to do so or to displace these over a shorter or longer distance. Especially with objects which have to remain at production machinery for some time, this can be an advantage.

In this respect further the possibility should be mentioned, that the spacing between the dogs is not constant. By choosing an appropriate pattern of the distances between the dogs some kind of caterpillar-like progression of the objects to be transported may be realised, such that the objects are engaged by the dogs at different moments, resulting in the fact that the acceleration forces and the differences between static and dynamic frictional forces between the objects and the primary beam are nivellated.

Finally a special embodiment of the step conveyor is mentioned in which below the secondary beam an overpressure is applied. This overpressure further minimizes the entrance of dirt into the step conveyor.

Hereinafter the invention will be elucidated further referring to the drawing, in which an embodiment of the step conveyor according to the invention is illustrated.

FIG. 1 shows as a longitudinal section according to I—I in FIG. 2 part of an embodiment of the step conveyor according to the invention in a schematical way and in a first position;

FIG. 2 shows a section according to II—II in FIG. 1;

FIG. 3 shows a view according to FIG. 1, however in a second position;

FIG. 4 shows a section according to IV—IV in FIG. 3;

FIG. 5 shows schematically a detail of a special embodiment of the step conveyor according to the invention in a first position, and FIG. 6 shows in correspondence with FIG. 5 the respective step conveyor in a second position.

In FIG. 1 part of a step conveyor according to the invention is represented. It comprises a primary stationary beam 1, which may comprise part of a working floor. Below the primary beam 1 a space (see FIG. 2) is formed in which a movable secondary beam 2 is housed. In the secondary beam 2 a number of bow-shaped segments 3 is excentrically journalled around pivot axes 4. In the figures there is represented only one of these bow-shaped segments 3. Each bow-shaped segment rests upon a stationary guideway 5.

At its top the secondary beam 2 carries dogs 6 (of which in the figures only one is represented).

On the primary beam or working floor 1 objects to be transported are placed, of which one is partially and schematically indicated by 7. In the position illustrated in FIG. 1 the bow-shape segment 3 is in such a position, that the distance between the pivot axis 4 and the point of contact between the circumference of the segment 3 and the guideway 5 is minimal. In this position the uppermost end of each dog 6 is below the level of the primary beam 1. Thus such a dog 6 cannot engage the object 7 to be transported.

If now the secondary beam 2 experiences a force directed to the left each bow-shaped segment 3 will roll to the left on top of the guideway 5, thereby reaching the position shown in FIG. 3. In this position the distance between the pivot axis 4 and the point of contact between the circumference of the segment 3 and the guideway 5 has increased relative to the position shown in FIG. 1, such that the secondary beam 2 is not only moved to the left, but also upwards. As a result the dog 6 is lifted beyond the level of the primary beam 1 and it can engage behind the lower edge of the object 7 to be transported. A continued movement of the secondary beam 2 to the left (as caused by an activating element not shown here) leads to a shift of the bow-shaped segment 3 in its illustrated position along the guideway 5. Thus the dog 6 also moves an object 7 to the left that has to be transported.

FIG. 2 represents clearly that in the position illustrated in FIG. 1 the dog 6 is positioned below the level of the primary beam 1; in FIG. 4 the situation is shown in which the dog 6 projects beyond this level.

The position shown in FIG. 1 and 2 generally is the rest position of the step conveyor. From this rest position the step conveyor is moved to the working position of FIG. 3 and 4 for transporting objects 7. However the position represented in FIGS. 1 and 2 occurs too when the step conveyor, after reaching the position represented in FIGS. 3 and 4, is moved back towards its starting position. For, starting from the position shown in FIG. 3 firstly a pivoting of the bow-shaped segment 3 towards the pivot position shown in FIG. 1 occurs, whereafter this segment 3 will slide to the right along the guideway 5. Thus again the original starting position is reached and the step conveyor can commence a new transporting cycle. Thus the step conveyor is fit for sliding forward the objects over a defined distance during each cycle.

As appears clearly from FIG. 3 a dog 6 does not lift an object 7 to be transported, but it engages behind the rim of the object 7, for example at the inner side of a circumferential edge at the lower side of a can. Like this the object is also supported by the primary beam or working floor 1 during transport.

Further it appears clearly from FIGS. 2 and 4 that the contact surface between the circumference of the segment 3 and the stationary guideway 5 is positioned at a higher level than a basis 8 positioned therebelow, such that dirt (such as lint particles) which might enter the step conveyor will find itself at a lower level, and will not influence the cooperation between the bow-shaped segment and the stationary guideway. Further the reversed U-shaped profile of the secondary beam 2 in a way acts as a shield for this contact surface.

The cooperation between the bow-shaped segment 3 and the stationary guideway 5 is such, that at one hand a pivoting motion of the bow-shaped segment relative to the stationary guideway may occur, but at the other hand in the extreme positions of the bow-shaped segment 3 a shift of said segment is possible relative to the stationary guideway 5 with as little friction as possible. Profiles fit for this function are amongst others described in Dutch patent applications 80.01352 and 80.04549.

In FIGS. 1–4 further a strip 9 is visible, which is journalled in the secondary beam 2 to be shifted to and fro in the longitudinal direction of said beam through an activating means not shown further. This strip 9 carries locking lips 10, which can cooperate with recesses 11 in the bow-shaped segments 3. Especially in the position of the strip 9 represented in FIGS. 1 and 3 the locking lips 10 are out of engagement with the recesses 11 of the segments 3, such that the previously described pivoting motion of the segments 3 is possible. If however the strip 9 is moved to the right the locking lip 10 enters the recess 11, such that shifting the secondary beam 2 to the left does not lead to a pivoting motion of the segments 3, but only to a shift of the segments 3 along the stationary guideway 5. Thus the dogs 6 will move to the left, but will not extend above the level of the primary beam or working floor. A transport of the respective objects 7 does not occur then.

In FIGS. 5 and 6 the operation of such a strip 9 acting as locking means is schematically elucidated. Illustrated is an embodiment, in which the secondary beam comprises at least two (partially represented) parts 12 and 13, which are interconnected through a hinge lip 14. In the left part 12 a strip 9 is provided comprising locking lips 10. In the position represented in FIG. 5 the locking lips 10 are brought into engagement with the segments 3 through an activating means not illustrated. In the drawing the right part 13 does not comprise such a strip 9. If now the assembly shown in FIG. 5 is moved to the left the segment 3, comprised in part 12, cannot rotate, but will only shift to the left along the stationary guideway 5. Thus the level of part 12 does not change. However, the segment 3 of the right part 13 can pivot, such that segment 13, apart from being displaced to the left, experiences an upward displacement and is lifted. Therefore the position schematically indicated in FIG. 6 is reached. Therefore objects being present above part 12 therefore are not transported, whereas objects being present above part 13 will be transported. Like this special motions of the objects to be transported may be accomplished, for example for creating or eliminating buffer zones. Of course it is possible too that part 12 does not comprise a strip 9 and part 13 does, or that both comprise such a strip or neither one does.

The displacement of the strip 9 can occur under influence of a drive means mounted in the secondary beam, for example an appropriate cylinder-piston assembly (not illustrated).

The driving means, which provides the to en and fro movement of the entire assembly may be constructed such, that its stroke is adjustable. Thus special transport movements of the objects to be transported may be realised. For this it is possible too that not all the spacings between adjoining dogs 6 are equal.

For completeness sake further an embodiment is mentioned, in which in the secondary beam 2 segments 3 are positioned, which alternately can pivot into the one and the other direction, thus for example as shown in FIG. 1 and oppositely thereto. By application of a strip 9, which in a first position locks all segments which can pivot in one direction, and which in a second position locks all other segments, a step conveyor can be realised, which, depending upon the position of the strip 9, conveys in the one or the other direction. This enlarges the function of the step conveyor at wish from only conveying capability to allow buffering capabilities according to the "last in-first out" principle.

The space, which especially in FIGS. 2 and 4 is visible below the primary beam 1 and in which the secondary beam 2 with its motionary mechanism is housed, may be connected to a source of overpressure, such that an outwardly directed air stream is created through the slit which is formed in the primary beam 1 for the passage of the dogs 6, said air stream preventing the entrance of dust or lint.

The described apparatus is especially fit for application in the textile industry, where for example cans filled with strands of cotton fibres have to be transported. Textile operations are a large source of lint particles which can hinder a good operation of moving parts of mechanisms. The present construction is characterized by a minimal amount of moving parts, and a good covering of the parts, such that the function remains safeguarded, also in dusty circumstances.

The invention is not limited to the embodiments described before, which can be varied widely within the scope of the invention. It is possible, as indicated schematically in the figures by hatched planes, that the sliding surface of the profile or guideway 5 and/or the parts of the segments 3 acting as sliding surface are made of a wear resistent material having low coefficient of friction.

I claim:

1. Step conveyor comprising a primary stationary beam (1) and a secondary beam (2) being movable upwards and downwards as well as to and fro relative thereto, said secondary beam (2) being supported by restrictedly pivotable bow-shaped eccentrically journalled segments (3) resting on a stationary guideway (5), wherein in a rest position the secondary beam (2) is positioned below the level of the primary beam (1), characterized in that in each position the secondary beam is positioned below the level of the primary beam (1) and carries at its top dogs (6) which in a rest position are positioned below the level of the primary beam (1) and which in an operational position extend beyond the level of the primary beam (1), whereas further the stationary guideway comprises a profile (5) extending upwardly from a basis (8), said profile (5) having at its highest point a contact surface for engagement with the circumference of the bow-shaped segments (3), wherein the bow-shaped segments (3) at their circumference have a substantially correspondingly shaped cross-section.

2. Step conveyor according to claim 1, characterized in that the secondary beam (2) comprises at least two sections (12, 23) interconnected in such a way that a relative vertical movement is allowed but that a substantial relative horizontal movement is prevented and wherein in at least one of these sections (12, 13) optionally activatable locking means (9, 10) are provided for preventing the segments from pivoting.

3. Step conveyor according to claim 2, characterized in that the locking means comprise a strip (9) which is slidable to and fro in the lengthwise direction of the secondary beam (2) and which can be engaged with or disengaged from recesses (11) provided in the segments (3).

4. Step conveyor according to claim 3, characterized in that the segments (3) alternatingly are pivotable in the one or the other direction, wherein the strip (9) in a first position engages the segments (3) which are pivotable in the one direction and disengages the segments (3) which are pivotable in the other direction, and in a second position disengages the segments (3) which are pivotable in the one direction add engages the segments (3) which are pivotable in the other direction.

5. Step conveyor according to claim 3 or 4, characterized in that the strip (9) is driven by a drive means mounted in the secondary beam (2), such as a cylinder-piston assembly.

6. Step conveyor according to claim 1 characterized in that the stroke of the secondary beam (2) is adjustable.

7. Step conveyor according to claim 1 characterized in that the spacing between the dogs (6) is not constant.

8. Step conveyor according to claim 1 characterized in that below the secondary beam (2) an overpressure is applied.

9. Step conveyor according to claim 1 characterized in that the contact surface of the profile (5) and or the parts of the segments (3) acting as sliding surface are made of a wear resistent material having a low coefficient of friction.

* * * * *